United States Patent [19]
Lund et al.

[11] Patent Number: 5,658,690
[45] Date of Patent: Aug. 19, 1997

[54] MODULAR MOLDED COMPONENTS FOR A BIPOLAR BATTERY AND THE RESULTING BIPOLAR BATTERY

[75] Inventors: David L. Lund, Minneapolis, Minn.; Stephen G. Petrakovich, Suwanee, Ga.

[73] Assignee: GNB Technologies, Inc., Mendota Heights, Minn.

[21] Appl. No.: 586,955

[22] Filed: Jan. 16, 1996

[51] Int. Cl.⁶ .................... H01M 4/72; H01M 10/18
[52] U.S. Cl. .................... 429/210; 429/234; 429/246
[58] Field of Search .................... 429/210, 234, 429/233, 239, 245, 246

[56] References Cited

U.S. PATENT DOCUMENTS

| | | | |
|---|---|---|---|
| 2,256,105 | 9/1941 | Shank | 429/234 X |
| 2,694,100 | 11/1954 | Zahn | 429/234 |
| 3,269,863 | 8/1966 | Helms | 429/234 |
| 3,738,871 | 6/1973 | Scholle | 429/234 |
| 4,746,585 | 5/1988 | Stoner et al. | 429/234 X |
| 5,098,799 | 3/1992 | Bowen et al. | 429/234 X |
| 5,326,656 | 7/1994 | Meadows et al. | 429/210 X |

*Primary Examiner*—Anthony Skapars
*Attorney, Agent, or Firm*—Leydig, Voit & Mayer, Ltd.

[57] ABSTRACT

A molded plastic component for a bipolar battery comprises a metal substrate having a periphery which is embedded in the plastic and includes at least one surface suitable for accepting an active material paste, the plastic frame comprising a first set of opposed sides having a first thickness which defines the thickness of the active material paste which can be accepted and a second set having a thickness greater than that of the first set which provides a dam for the active material being applied, thereby achieving the ability to automatically paste such molded components on a commercial scale.

10 Claims, 7 Drawing Sheets

MODULAR MOLDED COMPONENTS FOR A BIPOLAR BATTERY AND THE RESULTING BIPOLAR BATTERY

RELATED APPLICATIONS

Henning et al., U.S. Ser. No. 08/563,193, filed Nov. 27, 1995, now U.S. Pat. No. 5,595,840, for "Method of Manufacturing Modular Molded Components for a Bipolar Battery and the Resulting Bipolar Battery."

Petrakovich et al., U.S. Ser. No. 08/613,925, filed Mar. 11, 1996, for "Method of Manufacturing Modular Molded Components for a Bipolar Battery and the Resulting Bipolar Battery."

FIELD OF THE INVENTION

This invention relates to batteries such as, for example, bipolar batteries utilizing modular molded components comprising an electrically conductive substrate molded into a plastic frame and to the resulting battery.

DESCRIPTION OF THE PRIOR ART

Lead-acid batteries and cells have been known for a substantially long period of time and have been employed commercially in a relatively wide variety of applications. Such applications have ranged from starting, lighting and ignition for automobiles, trucks and other vehicles (often termed "SLI batteries") to marine and golf cart applications and to various stationary and motive power source applications (sometimes termed "industrial battery" applications).

The lead-acid electrochemical system has provided a reliable energy source which is capable of being manufactured in automated production while providing acceptable quality. However, one serious drawback of either the flooded or sealed, absorbed electrolyte, lead-acid batteries is the relatively low energy and power density (i.e., kilowatts/unit weight and watt-hours/unit weight, respectively) provided by such systems. It has long been a desire to provide an energy source with the reliability of a flooded or sealed lead-acid battery system while at the same time achieving a much greater energy and power density.

For this reason, considerable effort over at least the last 20 years has been directed to using lead-acid and other electrochemical systems in a bipolar design. In such a design, by definition, the positive and negative plates in some fashion share the same conductive grid or substrate. Some of the patents relating to bipolar batteries or to components and the like for such batteries include the following U.S. Pat. Nos. 2,416,576 to Franz et al; 2,496,709 to Jelardin; 2,966,538 to Bernot; 3,728,158 to Poe et al.; 3,775,189 to Jaggard; 3,910,731 to Warszawski et al.; 3,941,615 to McDowall; 4,125,680 to Shropshire et al.; 4,964,878 to Morris; and 5,068,160 to Clough et al.

Some of these patents utilize metallic substrates which are molded into a plastic frame of varying configurations. However, there are a variety of technical problems that need to be addressed and solved when utilizing this approach. Indeed, some of the diverse problems precipitated alternative approaches which did not utilize metallic substrates. U.S. Pat. No. 4,658,499 to Rowlette is not only directed to such an alternative approach, but sets forth, as background, various other alternative approaches which have been suggested.

Thus, despite the substantial advantages that could be achieved using bipolar batteries and cells and the substantial amount of work and attention directed to this type of battery over at least the last 20 years, it would appear that bipolar batteries, such as bipolar lead-acid batteries, have remained a very promising but elusive curiosity, largely remaining as a laboratory curiosity. Thus, the need existed for a well-designed bipolar battery that would achieve the enhanced energy and power densities that only a bipolar battery can provide while satisfactorily dealing with the diverse problems in assembly and design identified by the prior art. More particularly, there existed a substantial need for a bipolar battery design composed of components that could be assembled in an automated, reliable fashion, while achieving a well-functioning battery in a cost-effective manner. U.S. Pat No. 5,429,643 to Lund et al., assigned to the assignee of the present invention, does provide a method for assembling a bipolar lead-acid battery which is amenable to automated production at commercially acceptable production rates, utilizing modular bipolar battery components which include a series of molded plastic frames with metallic inserts.

Nevertheless, and while the plastic molding operations involved are, in general, relatively straightforward, the extreme differences in thermal expansion and contraction characteristics between the metallic substrate and the type of plastic material that has been used for the frame create problems in controlling the molding operation. This situation is exacerbated by the fact that the metallic substrate used as the bipolar plate is necessarily relatively thin, and is susceptible to buckling, warpage, and the like, both during molding and in subsequent handling and processing steps. Modular plastic components, that are characterized by enhanced freedom from such warpage, buckling and the like need to be used so as to provide a bipolar battery having more consistent electrical performance due to improved uniformity of plate separation and of active material paste thicknesses.

Another significant problem which can occur in molding plastic components for bipolar batteries concerns stress factors which can result from the molding operation. Such stress factors and the like can manifest themselves in leakage and other problems in the resulting battery.

Indeed, the broader problem is to provide molded plastic components that are relatively free from leakage problems regardless of whether the leakage results from stress-induced issues in the molded part or not. More particularly, it has been found previously to be quite difficult, if not impossible, to provide such molded plastic components that reliably retain a satisfactory seal at the plastic-metal interface. This very problem, it is believed, is one primary reason why others in this field have attempted to employ approaches not utilizing this type of molded plastic frame with an embedded metallic substrate, as discussed in the previously referenced Rowlette '499 patent. The copending Henning et al. and Petrakovich et al. applications, identified herein, provide solutions to the warpage and leakage problems.

However, providing a commercially acceptable bipolar battery utilizing modular plastic frames presents still further obstacles. Thus, when these modular plastic frames are fused together in assembling the bipolar battery, the periphery of these frames must be drilled to provide suitable openings to allow the necessary acid electrolyte to be added, as well as to provide adequate venting when the battery is in service. In making these acid fill/vent holes, however, substantial care must be employed. Imperfect drill location, or "wandering," during the drilling operation may damage the metallic substrates, or otherwise cause other problems detrimental to bipolar battery life and performance, creating higher than desirable scrap rates, as well as undue high costs for these frames.

Still further, prior plastic frames did not lend themselves to automatic pasting to provide the consistent paste thicknesses necessary for desirable bipolar battery performance. The necessity of manually pasting active material onto the frame components results in unduly high manufacturing costs and may also involve significant safety implications.

It is accordingly a principal object of the present invention to provide a modular plastic frame for a bipolar battery having an embedded electrically conductive substrate that facilitates automatic pasting to yield a consistent active material thickness as is necessary for desired bipolar battery performance.

Another object of the present invention is to provide a modular plastic frame facilitating providing electrolyte acid fill/vent holes. A more specific and related object provides a modular plastic frame structure which minimizes, if not eliminates, the possibility of damage occurring during the drilling operation.

A further object of the preferred embodiment of this invention provides a modular plastic frame structure which facilitates alignment in assembly.

These and other objects and advantages of the present invention will be apparent from the following description and drawings.

SUMMARY OF THE INVENTION

In general, the present invention provides a modular plastic frame having a plastic frame in which an electrically conductive (typically metallic) substrate is embedded configured with a first set of opposing sides dimensioned to provide a desired paste thickness and a second set of opposed sides having a thickness greater than the desired paste thickness so as to allow containment of the active material paste therebetween. By positioning this second set of opposed sides in the direction of travel of a suitable active material pasting machine, a uniform pasting operation can be automatically carried out in a fashion which yields the desired paste thickness on a consistent basis, thereby providing a substantial advantage in achieving acceptable commercial rates of production.

In the preferred embodiment of this invention, drilling pockets are provided in the second set of opposed sides. Such drilling pockets, which may be formed during molding of the modular plastic component, provide a plastic frame both suitable for automated drilling of the necessary electrolyte acid fill/vent openings in the frames as well as minimizing any damage to the component that might otherwise result.

A further aspect of the invention provides an alignment structure adjacent each side of the second set of opposed sides. Thus, by beveling the corners of the plastic frame on this second set of opposed sides, the correct assembly of a stack of such components is facilitated, insuring that the desired drill pockets in the second set of opposed surfaces will be alternately positioned as is desired.

DETAILED DESCRIPTION OF THE INVENTION

The present invention is directed to providing molded plastic, modular electrochemical components, often termed "frames," which may be configured to provide the desired voltage and capacity characteristics in the resulting bipolar battery. Each of such components comprise a thin electrically conductive substrate embedded in a plastic frame which surrounds the periphery of the substrate, leaving an exposed surface or surfaces which can then be pasted with either negative or positive active material paste, or both, depending upon the configuration. Any suitable configuration considered desirable for a particular application can be utilized.

One illustrative configuration is shown and described in U.S. Pat. No. 5,348,817 to Rao et al. In that configuration, end frames, active frames and a center frame are utilized.

More particularly, as is described in the '817 Rao et al. patent, the end frames comprise a thermoplastic peripheral frame having a conductive member embedded therein. Any conductive material suitable for the particular electrochemical system of the bipolar battery involved may be used. As one illustrative embodiment, for use with a lead-acid bipolar battery, the conductive member can comprise a lead, or a lead alloy, sheet. Also, lead or lead alloy-clad copper materials are suitable. Materials of this type are known and are available. In any event, the metallic substrate or conductive member is relatively thin and flexible. As one illustrative example, the thickness of the metallic substrate can be 0.008 inch, more typically ranging from about 0.010 to about 0.030 inch. The range for the thickness can be varied as is desired for the particular application, and the range set forth is for purposes of illustration only.

As described in the Rao et al. patent, the end frames are unipolar, and both end frames may thus be pasted to be either positive or negative as is desired. The center frame utilized in the Rao et al. patent may be made similar to the end frames. Thus, the center frame may be molded from a thermoplastic material and may utilize a conductive member as a lead or a lead alloy or any other desired metallic substrate. The substrate may then be coated with conventional lead-acid battery paste. Pursuant to the Rao et al. '817 patent, both faces of the center frame are pasted to be either positive or negative. Whether the center frame is pasted to be positive or negative will depend on the terminal arrangement desired. When the central frame is pasted to be a central bi-negative plate to provide a negative central terminal, the end frames will be pasted to be positive plates, and vice-versa when a central bi-positive plate is used.

Bipolar active frames may be molded from a thermoplastic material and have embedded therein a conductive material as previously described with the other frames. Both faces of the lead alloy sheet or other metallic substrate utilized are coated with conventional lead-acid battery paste, one face being coated with a negative paste layer and the other with a positive paste layer.

The entire sheet of conductive member of the active frames serves the same purpose as an intercell connector in a conventional lead-acid battery. The high ratio of the intercell connection area to the pasted area and the very short intercell current path gives the bipolar battery design tremendous performance advantages in comparison to conventional lead-acid battery designs.

To form a recombinant or valve-regulated bipolar battery, highly absorbent glass separators made from microfine fibers are utilized. Such glass fiber separators are known and may be used, as may absorbent separators made from the microfine synthetic fibers only or made from a combination of synthetic and glass fibers. The thickness of the separators should be such as to provide the battery with adequate absorptivity so that sufficient electrolyte will be retained to provide the desired capacity, as is known. Additionally, as is also known, it is generally necessary and desirable to compress the separator by about 15 to 30 percent of the uncompressed thickness. Additional voltage and capacity are provided by employing additional active frames, positioned in the frame stack as described in the Rao et al. '817 patent. The preferred method of assembly of the respective frame members into a bipolar battery is disclosed in the aforementioned Lund et al. '643 patent, the disclosure of which is herein incorporated by reference, and as will be more fully described hereinafter.

Figure 1:
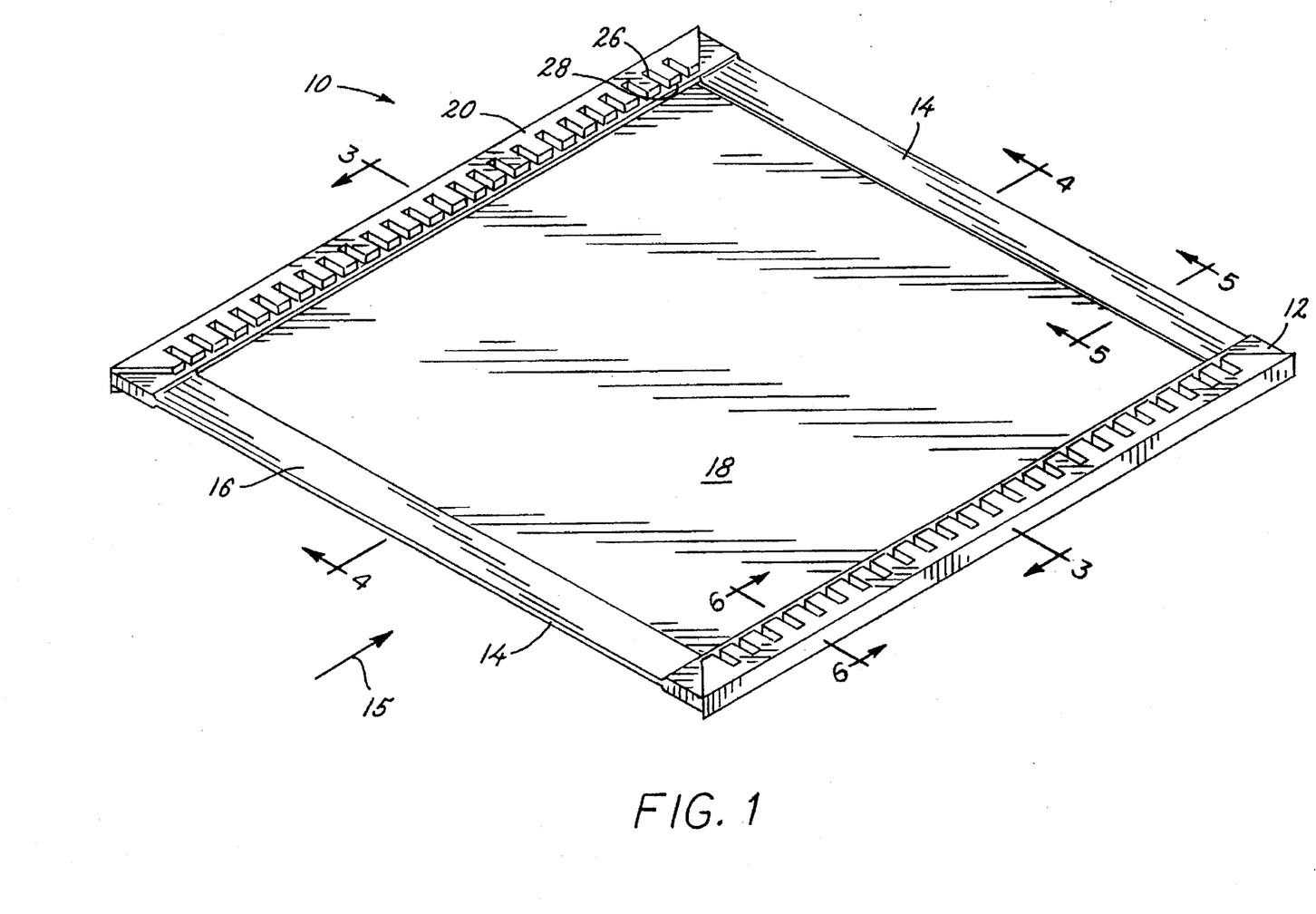
FIG. 1 is a perspective view of a preferred embodiment of the plastic frame of the present invention having a molded-in metallic substrate.
Figure 2:
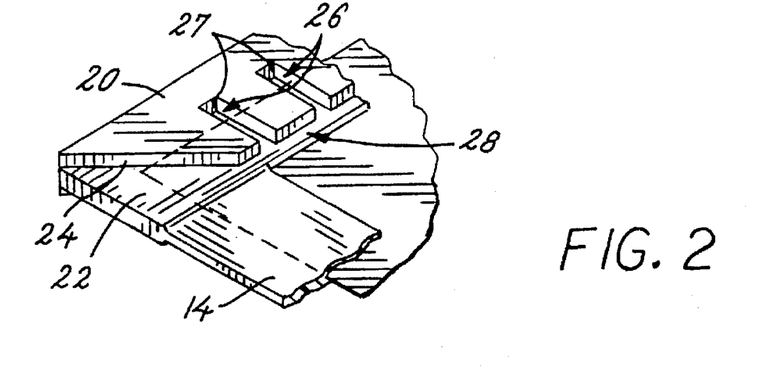
FIG. 2 is a partial and enlarged perspective view showing the configuration of the preferred embodiment of the plastic frame adjacent the corners of the frame.
Figure 3:
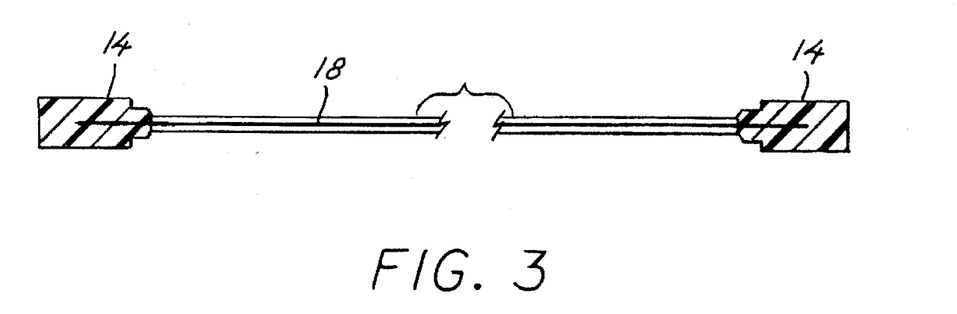
FIG. 3 is a cross-sectional view taken generally along 3—3 of FIG. 1 and illustrating the cross-sectional configuration of the illustrative frame structure perpendicular to the direction of travel when being pasted with an active material (the cross-section of the drill pocket being omitted in this view for simplicity)

Pursuant to the present invention, a modular molded plastic frame member is provided which may be used for the unipolar end (i.e., terminal) frames as well as for the center (when used) and bipolar frames that are amenable to an automatic pasting operation. FIGS. 1–6 illustrate a preferred embodiment of a unipolar or a bipolar plate frame according to the present invention which is pasted on both sides, typically with positive active material paste on one side and negative active paste on the other, for a bipolar plate and where only one side is pasted when a unipolar frame is desired, pasted with positive or negative active material as is required. To this end, and as is shown in FIG. 1, a molded modular frame member 10 is provided which comprises a plastic frame, shown generally at 12, having a first set of opposed sides 14 that are located perpendicular to the direction of travel (indicated by arrow 15) through an automatic pasting sequence and which define the depth of the thickness of the active material paste. The depth of the active material paste is thus defined by the dimension between the top surface 16 of this first set of opposing plastic frames 14 and the surface of a conductive substrate 18 which is embedded in plastic frame 12 about the periphery of the substrate. The relative thickness of the active material paste for the positive and negative plates can be varied as desired simply by suitably adjusting the relative height of the first set of opposing sides 14 of the plastic frame 12 relative to the surface of the substrate 18 as is shown in FIG. 3.

In accordance with the present invention, the plastic frame 12 includes a second set of opposing sides 20 that are thicker than sides 14. Disposed parallel to the direction of travel, sides 20 function as a dam, containing the active material paste being applied to the surfaces of the metal substrate 18 therebetween. Functionally, the thickness of sides 20 should be at least adequate to carry out the damming function, as well as to allow suitable acid fill/vent holes to be formed.

Achieving the desired performance of the resulting bipolar battery requires that the respective frame members have relatively uniform active material paste thicknesses. The frame structure of the present invention is amenable to automatic pasting to achieve a uniform paste thickness, not only providing more desirable processing costs, but also eliminating the safety implications that would be involved in manual pasting. The frame member used is preferably molded employing the processing disclosed in the pending Petrakovich et al. or Henning et al. applications. The disclosure of the processing from such applications are herein incorporated by reference.

As may be appreciated, when the frame members of the present invention are pasted as such frames move in the direction of travel 15, as shown in FIG. 1, current automatic pasting techniques would likewise apply paste to the first set of sides 14 of plastic frame 12. It would, of course, be desirable to fashion pasting equipment that would not result in any paste build up on these surfaces; however, such accumulation of paste can be tolerated.

As regards the active material paste, the paste densities and the desired thicknesses will vary, depending upon the type of bipolar battery involved as well as the desired performance characteristics. The particular paste densities and the type of paste, as well as the relative paste thicknesses, themselves do not form a part of the present invention, but can be varied as is desired. The particular requirements of the application and other considerations will dictate the specific parameters.

Another aspect of the present invention preferably includes stacking structure providing a consistent dimension as the various frame members are stacked together in the assembly process. To this end, and as is best seen in FIG. 2, the second set of sides 20 of frame 12 include stacking structure shown generally at 22 which comprises a platform elevated above the first set of sides 14. Regardless of any residual paste on the first set of sides 14 of the plastic frame resulting from the automatic pasting operation, the elevated platform 22 will provide a consistent thickness in stacking. This will be important for performance of a resulting bipolar battery because such consistent thickness upon assembly, equates to uniform compression and therefore enhanced access between the electrolyte and active material, all of which enhance the performance and service life of the battery.

Another aspect of the preferred embodiment of the present invention includes assembly aligning structure ensuring proper positioning as the necessary frames are stacked together in assembly. To this end, as best seen in FIG. 2, aligning stacking structure is provided by upstanding beveled surface 24 located at the ends of the second set of opposed sides 20. As may be appreciated, beveled surfaces 24 interfit together as alternately positioned frames 12 are stacked. The particular configuration of the assembly aligning structure can be varied as desired.

Pursuant to yet another aspect of the preferred embodiment of this invention, drilling pockets are included which allow automation in forming the necessary acid electrolyte fill/vent holes while minimizing the possibility of damage resulting from, for example, drilling into the metallic substrate itself. As is best seen in FIGS. 1 and 2, drilling pockets 26 have been molded into the second set of thick sides 20 of the plastic frame and are spaced along the length of such sides. Because the drilling pockets 26 are located above the substrate 18, any potential damage resulting from drilling should be minimized, if not totally eliminated. Further, by knowing the location of the pockets 26, and by adjusting the depth used in the drilling, an automated drilling protocol can be developed which achieves the necessary electrolyte acid fill/vent openings as well as avoiding any potential damage to the plastic frames. The drill depth in such a protocol can be thus limited to terminate short of the periphery of substrate 18 and still achieve the desired fill/vent flow path since the substrate terminates short of the outside end 27 of drill pocket 26 as seen in FIG. 2.

While unnecessary, including acid fill/vent openings on all sides of the stacked frames ensures versatility as well as simplifying inventory control, and the molding operation as well, and is preferred. Thus, by utilizing the same configuration for the plastic frames, only one mold is needed; and drill pockets are provided on each side of the battery resulting from alternately stacking the plate frames together, followed by assembly into a battery. The drill holes can then be made in any of the sides, or some or all, as is considered desirable for a particular application.

Figure 6:
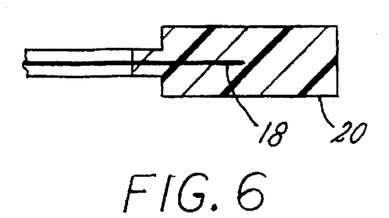
FIG. 6 is an enlarged partial cross-sectional view and showing the configuration of the frame between the drilling pockets.

Yet another aspect of the preferred embodiment of the present invention provides a ledge for accepting and suitably positioning the separator being used after completion of the pasting operation and after curing of the pasted plates has been carried out. To this end, and as is best shown in FIGS. 2 and 6, a ledge 28 is provided in the second set of thick sides 20 of the frame 12 to facilitate proper positioning in assembly.

In this regard, as can be seen from FIG. 2, the drill pockets 26 are in communication with a separator positioned on ledge 28 so that, after the acid fill/vent holes have been made, the necessary acid electrolyte can be readily added as described in the Lund et al. '643 patent, reaching the separators and the active material paste adjacent the separators. In service, this same liquid/gas fluid path will allow suitable venting as undue gas build-up vents out of the same holes used for adding electrolyte.

Pursuant to a still further aspect of the most preferred embodiment of this invention, the bottom of one or both sides of the drilling pockets 26 may be beveled. Because the bevels are provided by steel mold inserts positioned in the mold, one benefit achieved is a facile way to self-align the electrically conductive substrate when placed in the mold prior to injecting the plastic forming the plastic frame itself.

Figure 4:
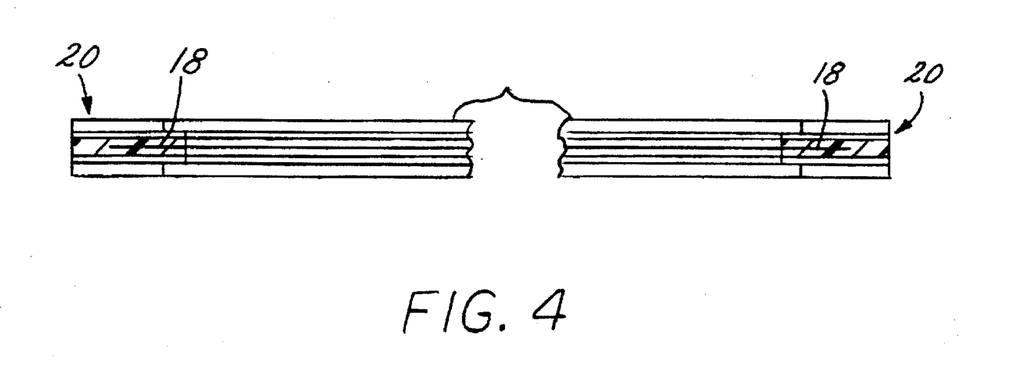
FIG. 4 is an end view taken from the perspective of a cross-section view which is taken generally along line 4—4 of FIG. 1 and showing the cross-sectional configuration of the illustrative plastic frame.

As may be appreciated, and as can be thus seen from FIGS. 3 and 4, the bottom surface of the frame used for a bipolar or unipolar frame is identical to the top surface. Thus, the same general active material pasting and electrolyte fill procedures need to be carried out.

Figure 5:
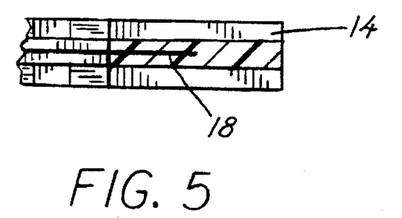
FIG. 5 is an enlarged partial cross-sectional view and illustrating the relative configuration after pasting of the second and thicker set of opposed sides of the plastic frame illustrated.

Also, as seen in FIGS. 5 and 6, the periphery of the electrically conductive substrate is fully embedded in the two sets of opposite sides 16 and 20 of the plastic frame 12, and the periphery terminates short of the outside edges of the plastic frame. Other than for providing terminals in which the tab forming the terminals extends through the outside edge of the plastic frame 12, an adequate distance from the metallic substrate periphery to the outside frame edge should be allowed so that fusing or other assembly operations can be carried out without adversely affecting the integrity of the embedded metallic substrate-plastic interface.

The end or terminal frames may be configured the same as the bipolar frames illustrated in FIGS. 1–6. However, because the paste is only provided on one side (viz., the interior side in the plate stack), one side of the terminal frame will be adjacent the exterior surface of the resulting bipolar battery. The internally positioned face of the terminal frames has a configuration as previously described, dimensioned to provide the paste thickness for the positive or negative active paste material, as the case may be. Additionally, it may be desirable to utilize a slightly thicker substrate for the terminal frame than for the bipolar frames so as to facilitate soldering or otherwise attaching the desired terminal to the substrate.

Figure 7:
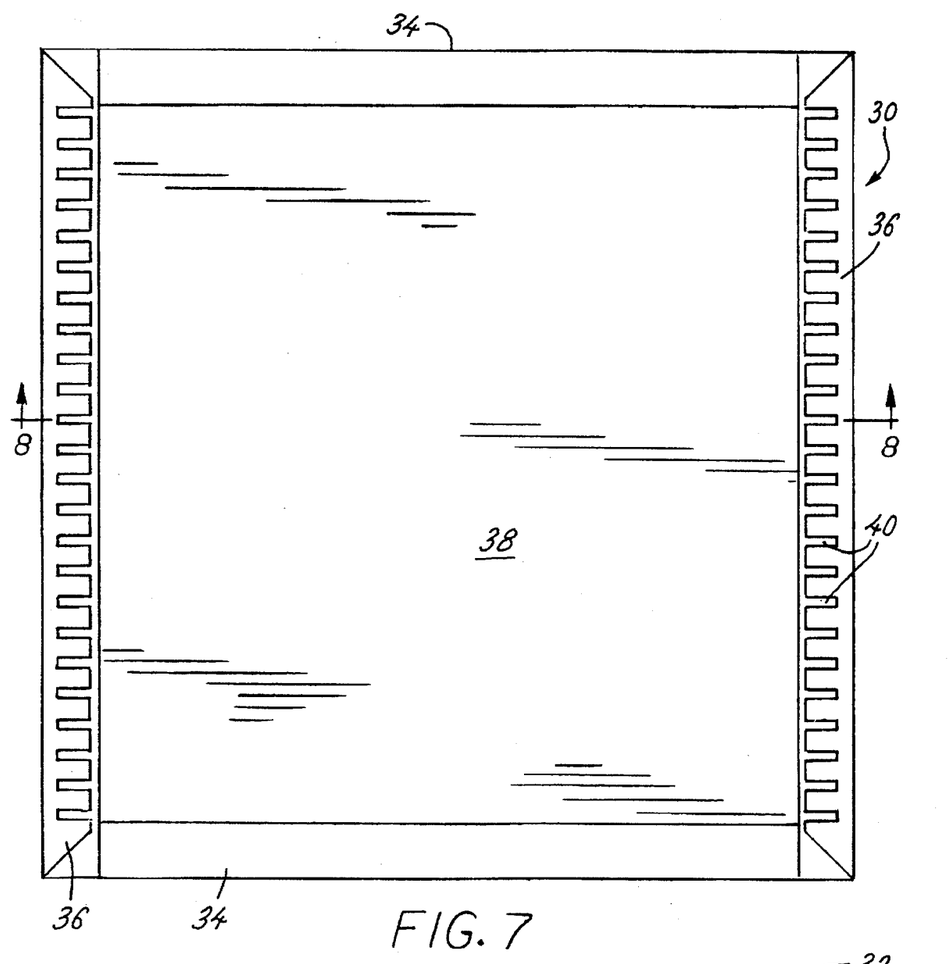
FIG. 7 is a top elevational view of a frame suitable for use as a terminal frame in a bipolar battery.
Figure 8:
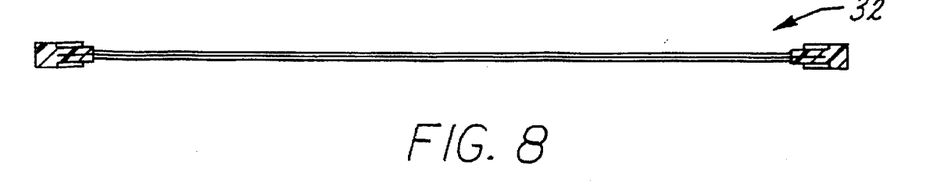
FIG. 8 is a cross-sectional view taken generally along the line 8—8 of FIG. 7 and showing the cross-sectional structure of the bipolar terminal frame.

FIGS. 7 and 8 thus show a terminal or end frame 30 having, on its interior face 32, a first set of opposed plastic sides 34 and the second set of thick sides 36 in which a metallic substrate 18 is embedded. Also, drill pockets 40 are provided as previously described.

As regards the plastic materials used as well as the composition of the electrically conductive substrate, any of a wide variety of materials are known and may be used. The particular materials of choice may well be dictated by such considerations as the type of molding operation utilized and the performance criteria for the particular applications of the bipolar battery.

Since the desire is to provide not only automated pasting, but also a resulting paste with a consistent thickness, it is preferred to utilize either the method disclosed in the copending Henning et al. application in which a post-treatment is carried out to remove any warpage resulting from the molding operation, or the molding operation disclosed in the copending Petrakovich application in which the plastic material used for the frame and the material of choice for the metallic substrate are selected and processed to provide matching shrinkage characteristics. However, any molding technique considered appropriate for a particular application can be used.

Figure 9:
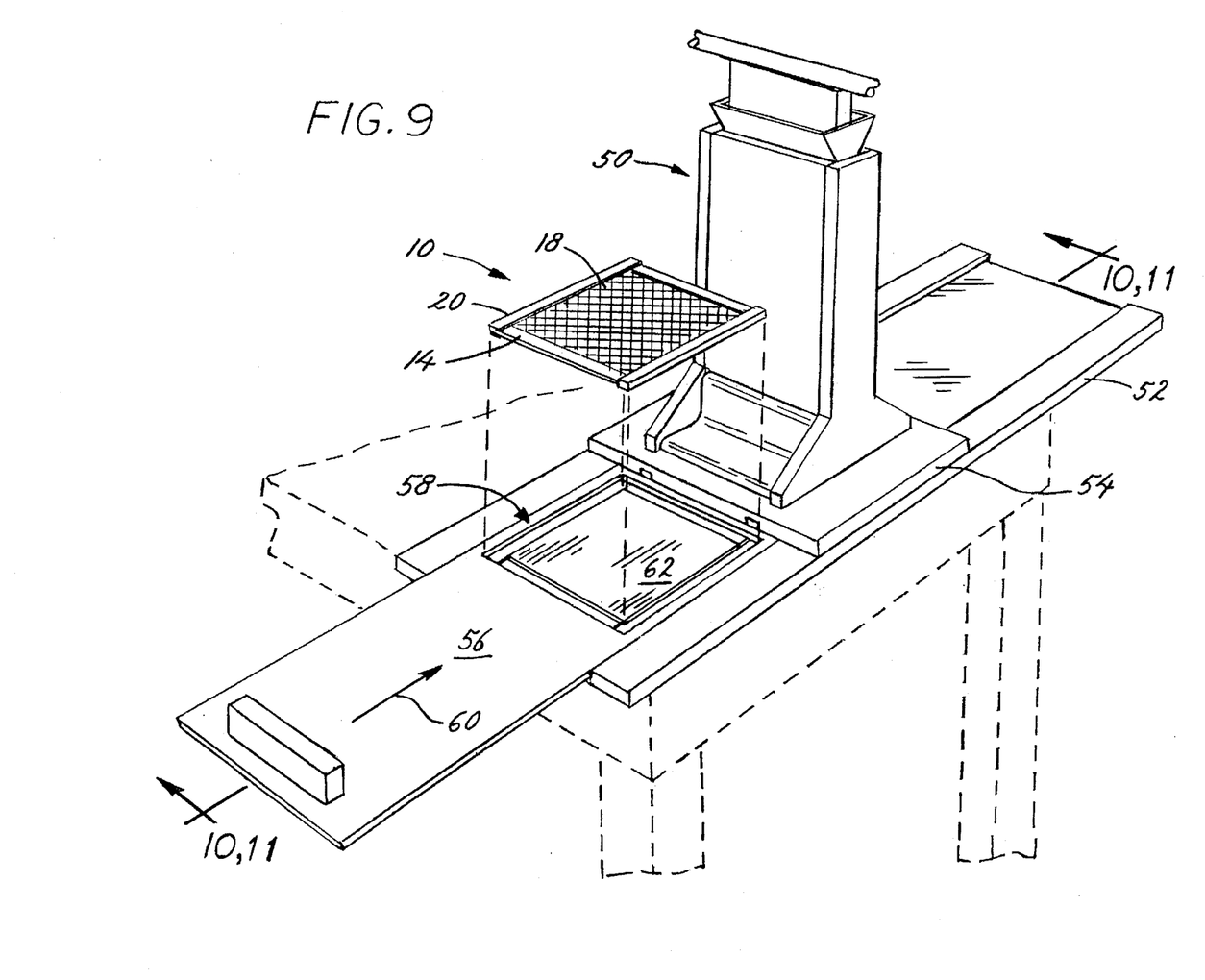
FIG. 9 is a perspective view of an apparatus which may be used to paste the plastic frames of this invention with active material.
Figure 10:
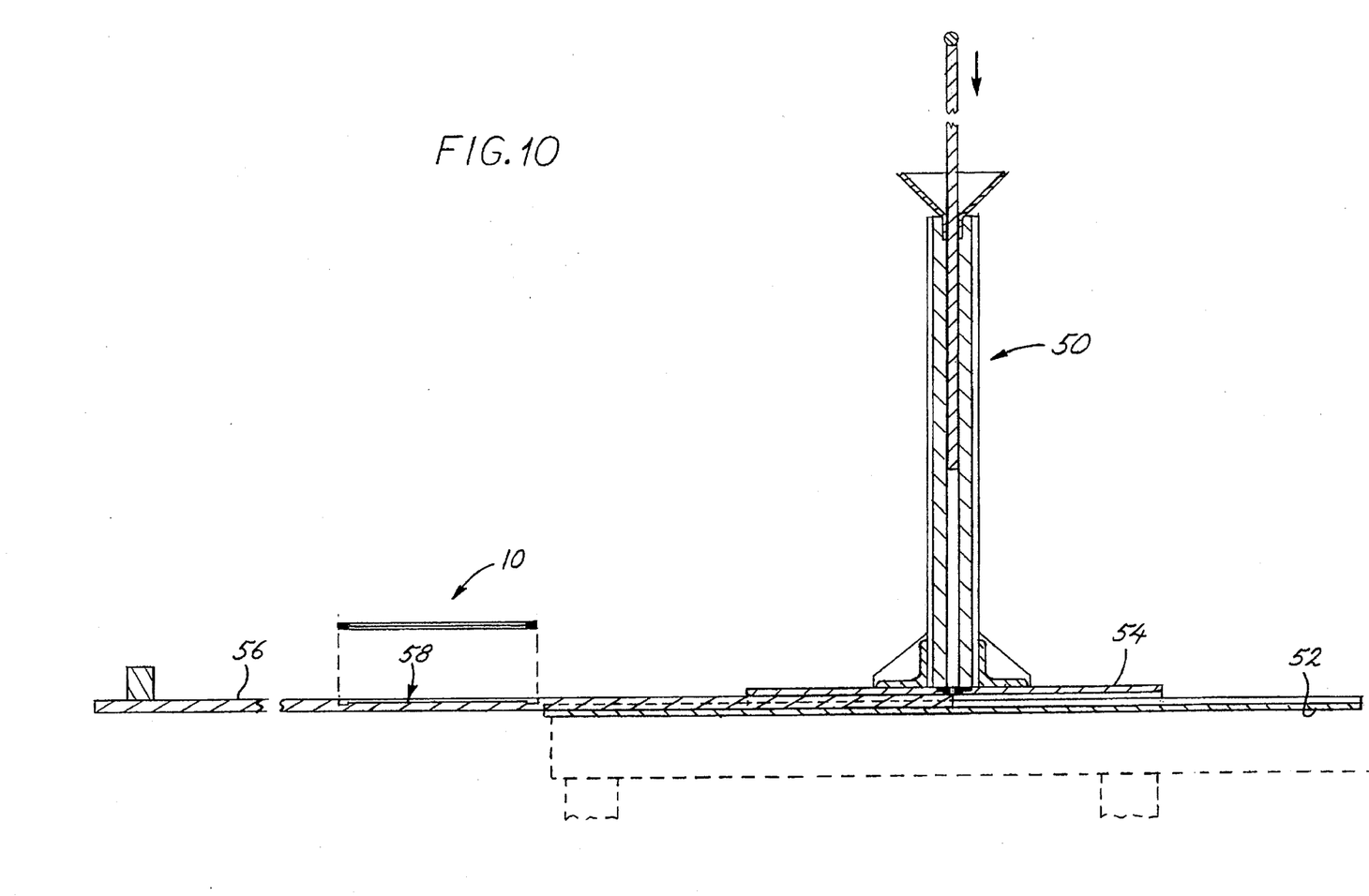
FIGS. 10 and 11 are cross-section views taken generally along lines 10—10 and 11—11 of FIG. 9, showing first a plastic frame in position for insertion into the pasting apparatus (FIG. 10) and then illustrating the positioning of the plastic frame during pasting (FIG. 11)
Figure 11:
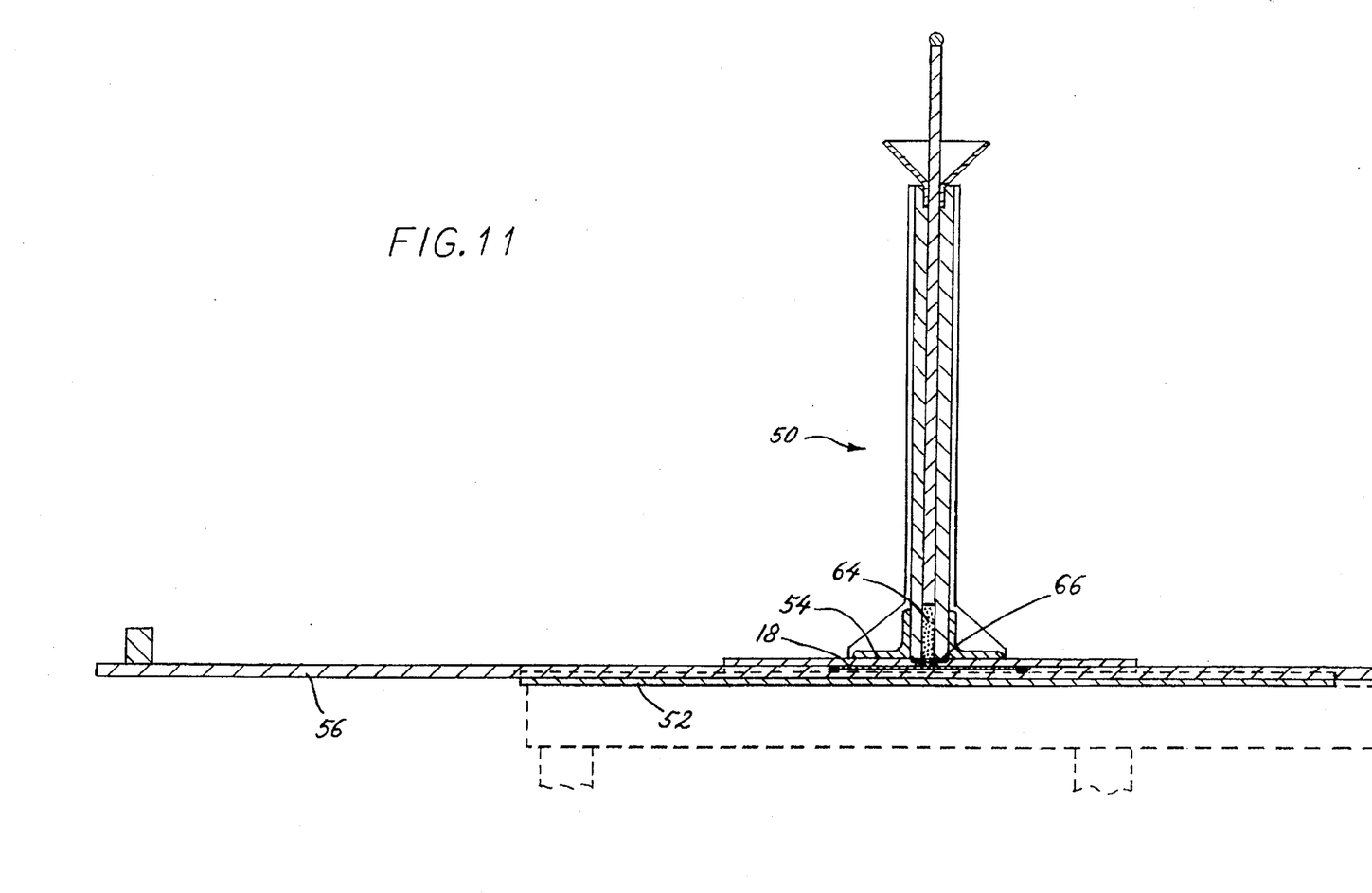

FIGS. 9–11 illustrate a laboratory scale pasting apparatus which can be readily adapted to a commercial apparatus to take advantage of the unique configuration of the plastic frames of the present invention. In general, the pasting apparatus illustrated includes a hopper 50 providing the active material paste supply, a bottom plate 52 having a top plate 54 upon which hopper 50 is mounted and a shuttle plate 56.

More particularly, as shown in FIGS. 9 and 10, shuttle plate 56 includes a frame support pocket 58 configured to accept and support a plastic frame 10 positioned therein with the first set of sides 14 of frame 10 being positioned perpendicular to the direction of travel through the apparatus (as indicated by arrow 60), and the second set of sides 20 of frame 10 being parallel to the direction of travel. Substrate support 62 prevents the bottom surface of substrate 18 that is not being pasted from buckling or the like as the paste is being applied to the upper surface of the substrate. As shown in FIG. 11, active material paste 64 is applied to the upper surface of substrate 18 via orifice 66.

The illustrated pasting apparatus contemplates the shuttle plate 56 moving relative to the fixed hopper 50, and the bottom plate 52, the top plate 54 and the hopper 50 all being connected together by bolts or the like. However, as may be apparent, the hopper 50 could be adapted to move relative to the shuttle plate 56.

Also, to paste the second side of the substrate 18, two differently sized frame support pockets 58 can be used. In each, substrate support 62 prevents the surface not being pasted from buckling; but the depth of the support pocket 58 needs to be greater when an already-pasted surface is being supported. Alternatively, a single shuttle plate could be used with a deeper pocket and a shim positioned on support surface 62 to support an unpasted substrate surface while still achieving the desired active material paste thickness. Removal of the shim would then allow the proper support for an already-pasted surface.

Any type of hopper desired may be used to supply the active material paste. A vibratory funnel can be desirably used, as one illustrative example. A funnel have an orifice of about 0.5 inch taken (in the direction of travel) is satisfactory, but this dimension can be varied as is desired. Further, lead-acid active material paste tends to spread somewhat; and, accordingly, it is satisfactory to lay down the paste through an orifice having a breadth of about 1/8 inch or so less than the width (i.e.,. the dimension perpendicular to the direction of travel through the apparatus) of the substrate being pasted.

As may be appreciated, the pasting apparatus illustrated can be converted to provide commercial scale paste application. The apparatus could be designed to allow movement of the hopper relative to the substrate surface being pasted in all three dimensions (i.e., up or down and side-to-side or forward and backward relative to the direction of travel).

The key components of a commercial pasting apparatus and procedure involve simply providing support for the substrate surface not being pasted during the pasting step. As compared to moving the paste supply relative to the stationary plastic frames that are to be pasted, it may be easier to provide a conveyor line having spaced, multiple support pockets or the like that hold the unique plastic frames of this invention and move the frames under, and then past, the paste supply.

In any event, the combination of the plastic frames and pasting apparatus disclosed herein are amenable to commercial production while achieving satisfactory quality control. Following pasting and curing, the individual frames can then be assembled into the desired battery.

An appropriate stacking of the various molded frame electrical components to provide a cell or battery having the desired voltage and capacity is shown in the hereinbefore identified Lund et al. '643 patent. In general, as may be appreciated, each bipolar frame will be positioned such that the negative faces the positive face layer of either an end or terminal frame or another bipolar plate. Correspondingly, the positive paste layer of each bipolar active frame will face a negative paste layer of the central frame. As additional voltage and capacity are desired, additional active or bipolar plate frames are employed, positioned in the frame stack as described herein. The assembly of the respective bipolar frame members into a battery can then be carried out as is desired using any known method. Preferably, the method disclosed in the previously referenced '643 Lund et al. patent is utilized, the disclosure of which is herein incorporated by reference.

Figure 12:
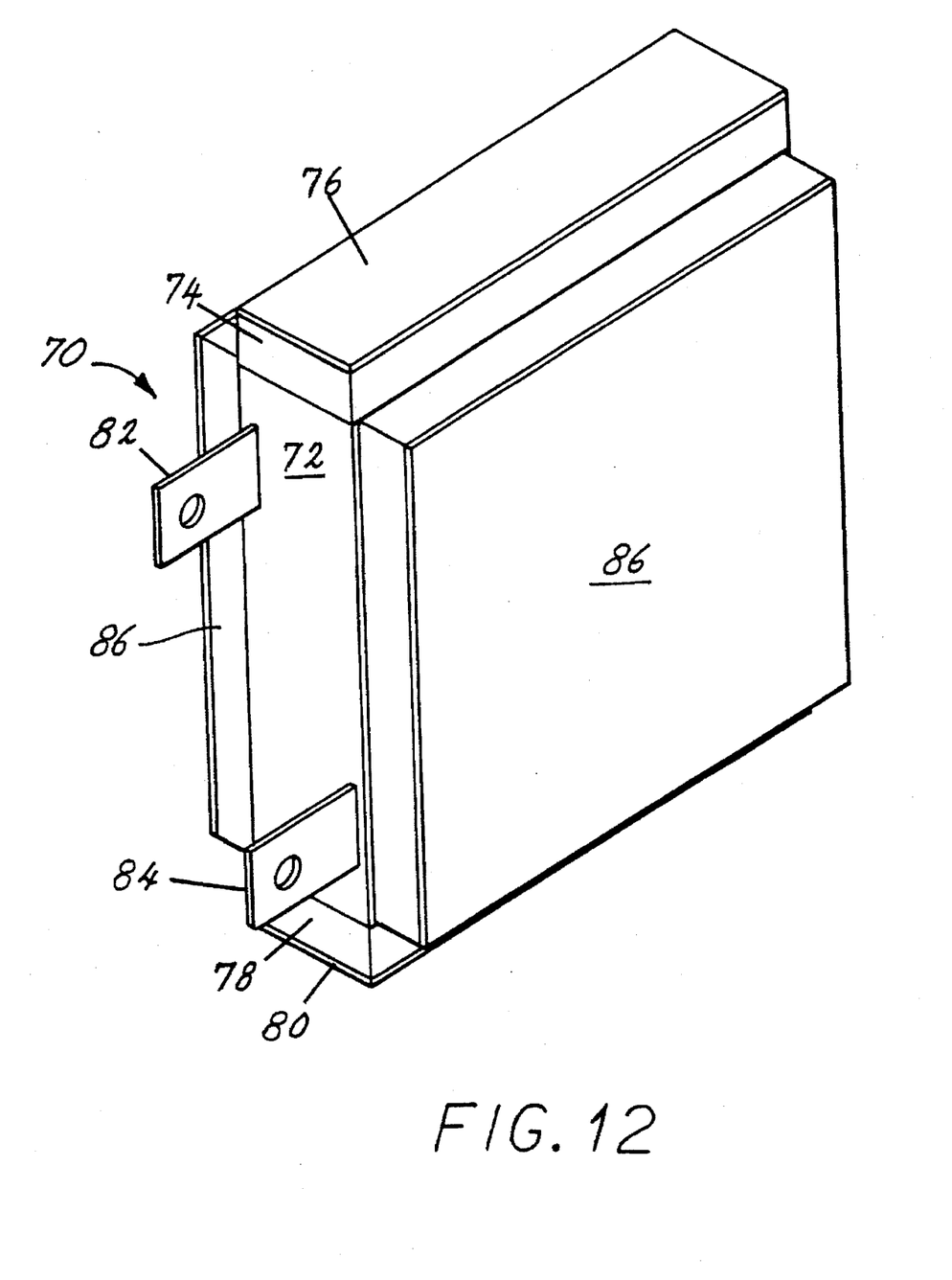
FIG. 12 is a perspective view of a preferred embodiment of a bipolar battery according to the present invention.

FIG. 12 shows, a suitable bipolar battery 70 made using the molded modular components of the present invention. As, is seen, the battery comprises side panels 72, fill/vent box 74, fill/vent box cover 76, vacuum box 78, vacuum box cover 80, positive terminal 82 and negative terminal 84 which may be electrically connected by using electrical jumpers/bus bars installed as necessary to provide the electrical connections desired. If desired, the bipolar battery 70 can be provided with support panels 86, enclosing plastic ribs or the like to provide structural rigidity and/or increased compression support for the battery. The further assembling and configuration of the batteries as described in the Lund et al. '643 patent, the disclosure of which is herein incorporated by reference.

As has been seen, the present invention provides a modular molded plastic frame which is amenable to automatic pasting on a commercial scale and the significant advantages resulting therefrom. In the preferred embodiment of this invention, several other features cooperate to facilitate the assembly of the bipolar battery, thus simplifying the respective operations and making commercial production possible.

While the present invention has been illustrated and described herein with respect to certain preferred embodiments, it should be appreciated that the present invention is not so limited. Thus, for example, while the present invention has been described principally in conjunction with a bipolar lead-acid battery, it should be appreciated that the present invention is likewise applicable to any type of a bipolar battery which can utilize a molded modular component comprising a metallic or electrically conductive substrate embedded in a plastic frame member. Of course, the active material paste and other aspects of the battery design will vary with the particular electrochemistry involved.

We claim:

1. A molded plastic component for a bipolar battery comprising a metal substrate having a periphery, a plastic frame about the periphery of the metal substrate, the periphery of the metal substrate being embedded in the plastic, at least one surface of the metal substrate being suitable for accepting an active material paste, the plastic frame comprising two sets of opposed sides, the first set having a first thickness and defining the thickness of the active material paste which can be accepted and a second set having a thickness greater than that of the first set and providing a dam for active material being applied to the surface of the metal substrate.

2. The molded component of claim 1, wherein the metal substrate has a thickness of from about 0.008 to about 0.030 inch.

3. The molded plastic component of claim 1, wherein at least one side of said second set of opposed sides of the frame includes a series of spaced drilling pockets located above the elevation of the metal substrate and terminating short of the periphery of the metal substrate.

4. The molded plastic component of claim 3, wherein both of the second set of opposed sides of the frame include drilling pockets.

5. The molded plastic component of claim 1, wherein said second set of opposed sides includes a ledge for accepting a separator for a bipolar battery.

6. The molded plastic component of claim 5, wherein at least one side of the second set of opposed sides includes drilling pockets spaced along the side and providing a fluid flow path in contact with a separator positioned on the ledge.

7. The molded plastic component of claim 1, wherein the second set of opposed sides includes at each corner thereof an elevated stacking platform, the platform being elevated above the surface of the first set of opposed sides a distance greater than the thickness of an active material paste could be applied to the surfaces of the metallic substrate.

8. The molded plastic component of claim 1, wherein at least one corner of each of the two opposed sides of said second set includes an aligning structure providing an interfit with a similarly configured molded plastic part.

9. A bipolar battery comprising a plurality of molded plastic components, each of the molded plastic components comprising a metal substrate having a periphery, a plastic frame about the periphery of the metal substrate, the periphery of the metal substrate being embedded in the plastic, at least one surface of the metal substrate having active material paste thereon and the plastic frame comprising a first set of opposed sides having a first thickness and defining the thickness of an active material paste being contained, and a second set of opposed sides having a thickness greater than that of the first set and providing a dam for the active material paste.

10. The bipolar battery of claim 9, wherein the metal substrate is a lead alloy and the bipolar battery is a lead-acid bipolar battery.

* * * * *